United States Patent Office 3,394,154
Patented July 23, 1968

3,394,154
α,α'-BIS(HYDROXYETHYLTHIO)-p-XYLENE AND THE DILAURYL ESTER THEREOF
Harry Braus, Springdale, and Fred D. Waas, Columbus, Ohio, assignors to National Distillers and Chemical Corporation, New York, N.Y., a corporation of Virginia
No Drawing. Original application Oct. 11, 1965, Ser. No. 494,878, now Patent No. 3,330,855, dated July 11, 1967. Divided and this application Feb. 1, 1967, Ser. No. 613,114
2 Claims. (Cl. 260—399)

ABSTRACT OF THE DISCLOSURE

α,α'-Bis(hydroxyethylthio)-p-xylene and its dilauryl ester are new components useful in the stabilization of polyolefins.

---

This is a division of copending application Ser. No. 494,878, filed Oct. 11, 1965, now Patent 3,330,855, which is a division of application Ser. No. 222,943, now Patent 3,226,357, issued Dec. 28, 1965.

This invention relates to new compositions of matter and particularly to xylene thioether derivatives.

Polymers of aliphatic olefins, such as for example polyethylene and polypropylene, have numerous valuable properties which permit them to be used in the manufacture of pipe, film, wire, coatings, molded objects such as bottles, and the like. These polymers have high tensile strength, are not subject to stress cracking, and display very little creep under load. It has been observed, however, that such polymers under conditions of elevated temperature and/or mechanical working, particularly in the presence of oxygen, undergo molecular degradation resulting in a deterioration of physical properties. Adequate stabilization of such polymers is of utmost importance in order to protect the polymer during fabrication and use. The molecular breakdown which occurs in these polymers during fabrication is evidenced by a substantial increase in the melt flow rate and in the color of the polymer.

It is an object of this invention to provide compounds that will stabilize polymers of aliphatic olefins so that they can be processed under conditions of elevated temperature and mechanical working without substantial increase in the melt flow rate and without significant color changes. Another object is to provide compositions comprising polymers of aliphatic olefins and one or more xylylene thioether derivatives, alone or together with other known stabilizers for polymers of such olefins. Other objects will appear hereinafter.

It has been discovered that polymers of aliphatic olefins can be stabilized against degradation by incorporating into the polymer xylylene thioether derivatives having the following structure:

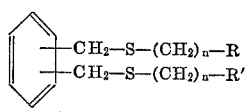

wherein $n$ is an integer from 1 to 4 and R and R' are each selected from the group consisting of —O—CO—R" and —CO—OR", wherein R" is an aliphatic radical having from 10 to 22 carbon atoms. Although R and R' can be different, it is generally preferred that they be the same.

The polymers with which these stabilizers can be used successfully are the normally solid polymers of aliphatic olefins having from 2 to 6 carbon atoms per molecule, such as polymers of ethylene, propylene, 1-butene, isobutylene, 2-butene, 1-pentene, and 1-hexene, and copolymers thereof. Of special importance among these is polypropylene.

These stabilizing compounds can be mixed with the polyolefin in any suitable manner that will effect thorough distribution and dispersion. This can be accomplished in a machine suitable for mixing solids, as by milling the polyolefin polymer with the addition agent on heated rolls, such as are used in the compounding of rubber, or on other suitable milling or mixing equipment, such as for example a Banbury mixer or other rubber mill. Instead of adding the agent to the polymer in the solid or molten state, it can be added to a solution or suspension of polymer in an organic solvent or to an aqueous dispersion thereof and the volatile solvent subsequently removed by vaporization.

In general the amount of agent to be added to the polyolefin depends upon the degree and kind of stabilization desired. The amount of agent added can vary from about 0.001 to about 5.0 percent based on the weight of the polyolefin polymer, but as a rule it is preferred to use the minimum amount required to achieve the desired results. The preferred amount used will ordinarily vary from about 0.05 to 0.5 parts by weight per hundred parts by weight of polyolefin.

The above-defined compounds may be used in combinations with other stabilizers and in particular with those of the hindered bisphenol type such as Cyanamid 2246 which is a derivative of 2,2'-dihydroxydiphenylmethane; allegedly it is 2,2' - methylene-bis(4-methyl-6-tertiarybutyl-phenol). The novel stabilizers of this invention may also be used in combination with other stabilizers of the hindered bisphenol type such as the commercial products Cyanamid 162 which is 2,2'-methylene-bis(4-ethyl-6-tertiarybutyl-phenol); Antioxidant 712 which is 4,4'-bis(2,6-di-tertiarybutyl-phenol); or Antioxidant 762 which is 2,6-di-tertiarybutyl-α-methoxy-p-cresol.

There are certain practical commercial advantages that frequently accompany the use of such combinations of stabilizers, as distinguished from the use of a single stabilizer material or compound. For example, one of the stabilizers of the combination might be costly or difficult to acquire in commercial amounts while the other stabilizer of the combination might be relatively cheap and readily available. In such a situation it is desirable to be able to substitute the cheaper stabilizer for a portion of the more expensive stabilizer and still be able to obtain good stabilization.

In one preferred embodiment of the invention R and R' in the above formula contain the ester grouping —O—CO—R". These compounds may be prepared, for example, by treating a mercaptoalkanol having from 1 to 4 carbon atoms, such as 2-mercaptoethanol, with sodium mercaptide, which is then reacted with one or a mixture of xylylene dichlorides to form the corresponding α',α'-bis(hydroxyalkylthio)xylene which has the following general formula:

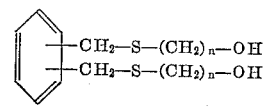

wherein $n$ is an integer from about 1 to 4.

The above compound is then esterified in any known manner. The diester may be obtained, for example, using approximately two equivalents of the desired fatty acid by well known esterification reactions. The monoesters are prepared by a similar procedure using about a onefold excess of the glycol. The esters have the formula:

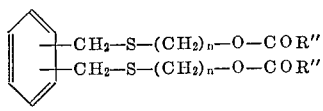

or

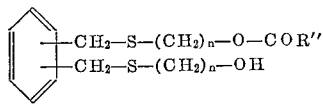

In analogous manner the mono- and di-fatty acid esters may be prepared from a saturated fatty acid having from 10 to 22 carbon atoms. Examples of such esters include the monolaurate, the dilaurate, the monostearate, distearate, and analogous compounds derived from other fatty acids such as capric, myristic, palmitic, arachidic, and the like.

In another embodiment of the invention R and R' in the above formula which defines the invention contain the ester group —CO—O—R''. These compounds may be prepared directly from a mercaptoalkanic acid ester and an α,α'-dihalo-xylene. For example, lauryl B-mercaptopropionate is treated with sodium ethoxide to form the corresponding sodium mercaptide, which is then reacted with α,α'-dichloro-p-xylene to form the α,α'-bis(lauryl B-thiopropionate)-p-xylene. In place of an ester of B-mercaptopropionate, an ester of mercaptoacetic acid or mercaptobutyric acid may also be used. Similarly, in place of the lauryl ester, fatty alcohol esters of other fatty acids obtained from a saturated fatty acid having from 10 to 22 carbon atoms, for example, palmityl, stearyl, and the like may be used. The esters have the formula:

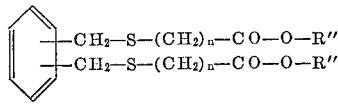

wherein $n$ is an integer from 1 to 4.

The following examples are presented to be illustrative only and are in no way intended to limit the invention specifically thereto:

EXAMPLE I

To a one-liter 2-necked indented flask equipped with a stirrer, condenser, and a dropping funnel was added 450 ml. of absolute ethanol. 23 grams of sodium was dissolved in the alcohol. The solution was cooled, and 78 grams of 2-mercaptoethanol was carefully added. The solution was heated to reflux, cooled somewhat, and 90.9 grams of α,α'-dichloro-p-xylene added dropwise. The reaction mixture was heated under reflux for one hour. A Dean-Stark trap was then inserted between the flask and condenser, and 350 ml. of ethanol was collected. The residue was cooled and the precipitated sodium chloride was filtered and washed several times with small portions of ethanol. The ethanolic solution was evaporated on the steam bath to yield the crude product. Purification was accomplished by Soxhlet extraction of the crude product with ether and crystallization from the ether at 0° C. to obtain α,α'-bis(hydroxyethylthio)-p-xylene. Sulfur: Calc'd, 24.81%; found, 24.6%.

EXAMPLE II

A mixture of 40.0 grams of lauric acid and 25.8 grams of α,α'-bis(hydroxyethylthio)-p-xylene was heated at 170–200° C. for 6 hours during which time 3 ml. of water was collected. The reaction mixture was taken up in 100 ml. of benzene, washed with water, 5% sodium hydroxide solution, and again with water. The organic layer was separated and filtered. The benzene was evaporated, and the residue recrystallized from 300 ml. of hexane to yield the dilauryl ester. Sulfur: Calc'd, 10.28%; found, 10.2%.

EXAMPLE III

Both α,α'-bis(hydroxyethylthio)-p-xylene (prepared in Example I) and its dilauryl ester (prepared in Example II) were tested as stabilizers with polypropylene in the following manner:

The thermal and oxidative breakdown were determined by measuring the change in flow rate (ASTM Test Method D–1238–57T, 2160-gram load at 230° F.) and by observing the color change upon extended milling at 350° C.

A sample of polypropylene (0.905 g./ml. density, 5.9 g./10 min. flow rate) free of stabilizers and in the form of a 10-mesh powder and the desired quantity of stabilizer as a 1 percent solution in benzene were charged to a Hobart mixer. The mixer was allowed to stir until all of the solvent had evaporated. A 400-gram aliquot of the resulting composition was then milled on a two-roll, differential speed, rubber mill at 350° F. Starting from the time at which all of the polymer had melted and banded, 30-gram samples of polymer composition were removed at 5, 10, 20, 30, 45, and 60-minute intervals.

Portions of each such sample were used for a determination of melt flow rate and for the preparation of a pressed 1-inch by 1-inch by 50-mil sheet for mounting on white cardboard for color comparison.

Each of the compounds tested functioned effectively as a stabilizer.

As will be evident to those skilled in the art, various modifications of this invention can be made or followed in the light of the foregoing disclosure and discussion without departing from the spirit or scope thereof.

What is claimed is:
1. α,α'-Bis(hydroxyethylthio)-p-xylene.
2. The dilauryl ester of the compound of claim 1.

References Cited
UNITED STATES PATENTS 3,226,357 12/1965 Braus et al. _____ 260—45.85
3,330,855 7/1967 Braus et al. _____ 260—399 X NICHOLAS S. RIZZO, *Primary Examiner.*

J. H. TURNIPSEED, *Assistant Examiner.*